United States Patent Office 2,953,505
Patented Sept. 20, 1960

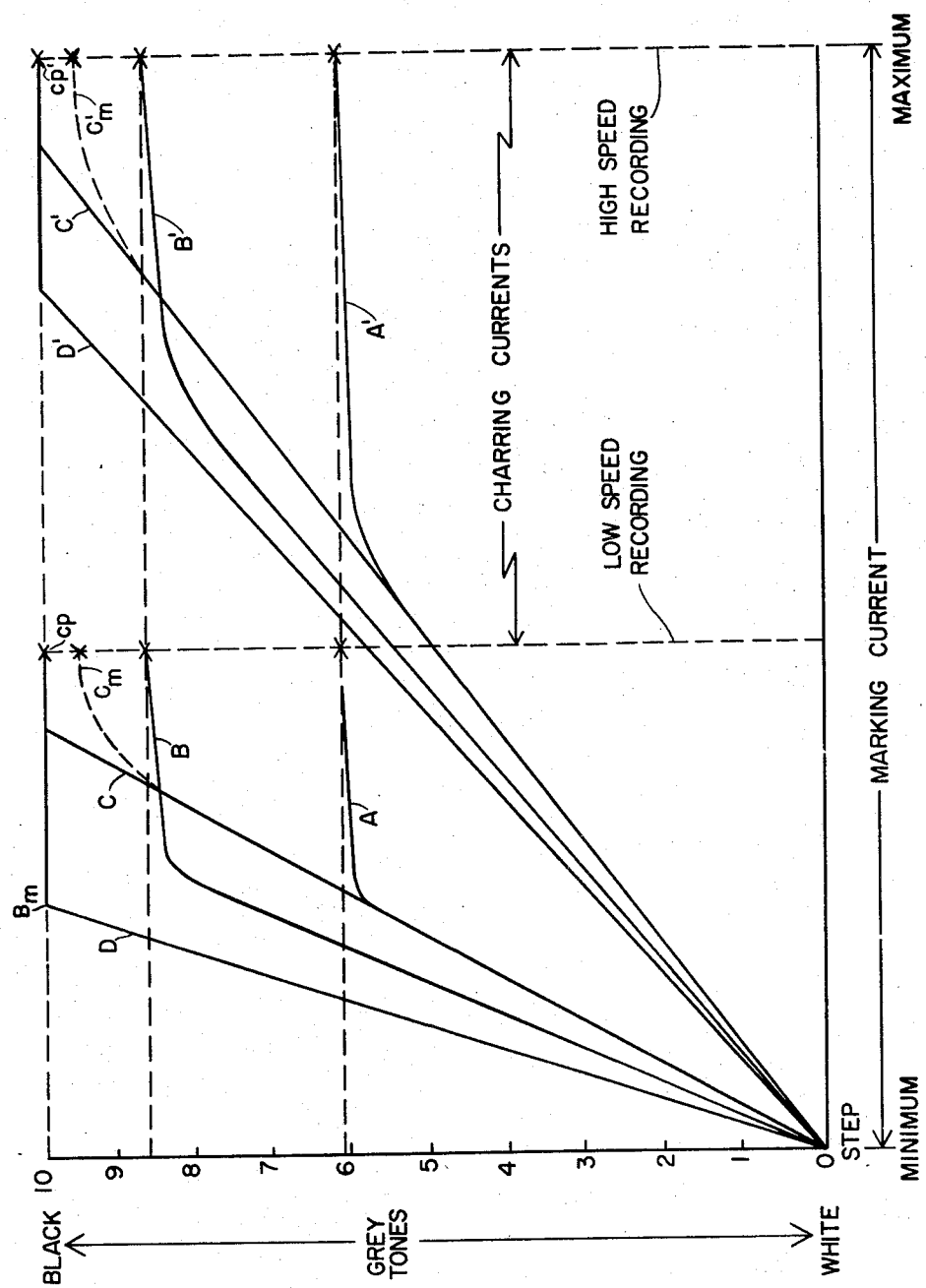

2,953,505

ELECTROLYTIC RECORDING MEDIUM

Arthur H. Mones, Brooklyn, N.Y., assignor, by mesne assignments, to Hogan Faximile Corporation, a corporation of Delaware Filed Dec. 1, 1954, Ser. No. 472,299

6 Claims. (Cl. 204—2)

This invention relates to the art of electrolytic recording media and particularly concerns a recording medium which provides a greater range of recorded tonal values than has hitherto been attainable.

A principal object is to provide a novel recording medium adapted for recording electrically a greater range of grey tones from white to black than has heretofore been attainable.

A further object is to provide a novel electrolytic recording medium for recording a greater range of grey tones from white to black, at relatively higher recording speeds and with relatively lower marking currents than has hitherto been attainable.

Another object is to provide an electrolytic recording medium adapted for recording a greater range of grey tones from white to black, while being held at normal ambient temperatures or while being moderately heated, than has hitherto been attainable.

Other and further objects and advantages of the invention will become apparent from the following description taken together with the drawing, wherein is shown a chart useful in explaining the nature of the invention.

Electrolytic recording is the art of recording by means of the electrolytic action of an electric current in a suitable electrosensitive medium. The recording current is localized to produce marks corresponding to graphic copy scanned at a remote point. In electrolytic facsimile recording it is common practice to dispose a recording sheet between suitable intersecting anode and cathode electrodes, at least one of which is in motion to accomplish progressive movement along a line of the recording point of intersection of the electrodes. The recording sheet is also drawn past the electrodes at a regular rate to accomplish line by line recording. A suitable facsimile recording device is disclosed in the Hogan Patent 2,575,959.

In one method of recording, the anode electrode or stylus is formed of or contains iron, vanadium or another oxidizable metal and carries the recording current to a porous recording sheet. The sheet is electrically conductive, being impregnated with a solution of a lake-forming compound and an electrolyte. During passage of the recording current the metal anode is dissolved into the electrolytic solution. The metal and lake-forming compound form a complex ion or molecule at the recording point, which point changes in color in proportion to the intensity of current flowing therethrough. At maximum density of color the mark is brown-black. Known types of electrolytic recording papers which act in this way are described in the Hogan et al. Patent 2,339,267, and the Wagner Patent 2,358,839.

During the process of recording at speeds higher than about 90 lines per minute the electrolytic recording action in these types of paper may not be completed during the short interval that the marking point contact of the electrodes with the paper is maintained, so that the recorded mark is pale grey and does not correspond in intensity to the tonal density of the original scanned picture, photograph, or other graphic copy.

One expedient for more completely carrying out the chemical reaction to increase color density and to extend the grey tone scale in a recording made by means of a color lake formation has been described in the Tribble Patent 2,485,678. This scheme includes application of heat to recording papers of the Hogan and Wagner types above mentioned after the mark is recorded. This heat is usually applied in the critical temperature range of 250° F. to 450° F. and has the effect of increasing the oxidation of the complex molecule formed by the lake forming marking compound and the metal employed in the recording anode. The temperature of heating substantially exceeds the temperatures required for merely drying the paper.

The application of such heat after recording does not always sufficiently extend the tonal range of recording. If the temperature should be raised too high at any particular recording speed the charring temperature of the paper may be reached and the recording will be destroyed.

In the drawing, curve A shows the maximum grey tone density which is obtainable when recording at a relatively low speed of about 90 lines per minute, using electrolytic recording paper of the type described by Wagner in Patent 2,358,839 without heating after recording. Note that the recording tonal density just reaches the sixth step in a ten step grey tone density scale from white to black. Curve B shows the effect of heating the same paper according to the Tribble Patent 2,485,678 after recording at the same speed as the unheated paper of curve A. To obtain curve B the recording initially made as shown by curve A is then heated to intensify the marking to produce the tonal densities shown by curve B. Note that the maximum attainable grey color tone level is not obtained by post-heating according to the Tribble patent. Curve C shows that a greater white to black tonal density range appears to be obtained with recording paper embodying the present invention without heating the paper during or after recording. Curve D shows that substantially the same range of tonal values appears to be obtained with recording paper embodying the present invention when the paper is moderately warmed by heat radiated from an infra-red lamp or other means during recording at a temperature well below the boiling point of the water content of the impregnant, but at marking currents less than required for unheated paper. Curves A′, B′, C′, and D′ correspond to curves A, B, C, D, for the same types of recording papers and recording methods except that the recordings have been performed at a higher speed of about 360 lines per minute. Note that at the higher marking speed higher marking currents are required to obtain the same tonal levels reached with lower marking currents at the lower marking speed. At both higher and lower speeds heated and unheated recording papers embodying the invention apparently reached the tenth step in the tone scale well below the charring point CP of the paper as shown by curves C, D, the charring point CP′ for curves C′ and D′. Conventional type electrolytic recording papers reached color tone saturation levels and ultimately charred as marking current increased without ever recording the tenth or black tone level as shown by curves A, B, A′, B′.

Basically my new recording paper is impregnated with a solution containing a metal lake-forming marking compound and electrolyte as heretofore known, with the addition of a suitable oxidizing agent. This oxidant must oxidize the complex molecule or ion formed by the marking compound and the metal. The oxidant must be stable in normal ambient conditions, that is, it must not lose its oxidizing ability on standing before the paper is marked. If the oxidant contains oxygen it must not release this oxygen prior to recording. When the marking current is applied the oxidant must accomplish its oxidizing effect during the very short time the marking current is applied. In addition the degree of oxidation of ions or molecules in the solution at the marking point or area must be controllable and depend upon the amount of marking current applied during the marking interval or upon the applied marking current density for a given area of marking. The oxidant must be compatible with the lake forming compound and other constituent compounds in the impregnant, some of which are strong reducing agents. Also the oxidant must not be so active as to darken portions of the paper which are not to be marked.

Heretofore the presence of oxidants in the impregnant of electrolytic type recording papers has been considered very undesirable because it was found that most oxidants rendered the lake forming compounds unstable. Antioxidants have generally been added to the impregnant to counteract the oxidizing effect of any undesirable oxidants present. In the present invention by contrast, use of a suitable oxidant in an electrolytic type recording paper achieves the desired black marking effect not hitherto attainable in this type of recording paper.

The use of certain oxidants to oxidize dyes in various electrochemical recording processes has heretofore been known. In these processes the maximum color density of mark obtained is generally dark brown, green, blue or violet. In the present invention by contrast the color change at the recording point is obtained by passage of the electric current through an electrolytic solution to cause formation of a grey-black colored complex ion or molecule by the combined organic lake forming compound and the metal dissolved in the solution. The oxidant intensifies the blackness of the lake color to produce the desired black mark by oxidizing the complex instead of by initiating the color change as in the oxidized dye processes above mentioned.

It has been found that suitable oxidants for the present purpose may be chlorates, bromates, perchlorates, iodates, and periodates, etc. Certain oxidants will be more satisfactory with one lake forming compound than with another. An example of an impregnant formulation for a porous paper which has been found suitable as a recording medium according to the invention is as follows:

| | | |
|---|---|---|
| Water | cubic centimeters | 100 |
| Potassium nitrate | grams | 5.0 |
| Catechol | do | 5.0 |
| $NaH_2PO_4 \cdot H_2O$ | do | 0.1 |
| Thiourea | do | 0.1 |
| Oxalic acid | do | 0.1 |
| Potassium chlorate | do | 5.0 |

The proportions of electrolyte, lake forming compound, and oxidant may be substantially equal. Instead of potassium chlorate, an equal quantity (5.0 grams) of potassium iodate, sodium perchlorate, sodium periodate, potassium bromate, or other equivalent oxidizing agent may be substituted.

Certain oxidants have been found unsuitable for use in the present invention. Chromate salts oxidize lake forming compounds such as catechol on standing. Other oxidants such as peroxides are similarly objectionable.

In the recording medium, the oxidant acts to some extent as an electrolyte and may be used in a quantity substantially equal to the amount of electrolyte. In conventional electrolytic recording papers a greater proportion of electrolyte is used than is indicated in the example above. Thus the cost of adding the oxidant is partly or entirely offset by the saving effected in using a lesser amount of electrolyte.

As another example, there may be mentioned the following formulation for the impregnant of the porous paper support:

| | | |
|---|---|---|
| Water | cubic centimeters | 100 |
| Potassium nitrate | grams | 5.0 |
| Catechol | do | 5.0 |
| Oxalic acid | do | 0.1 |
| Potassium chlorate | do | 5.0 |

In both examples the oxalic acid acts as an acidifier, potassium nitrate is the electrolyte, and catechol is the lake forming compound. Thiourea is included in the first example to stabilize the catechol and even though the catechol, thiourea and oxalic acid are all reducing agents, the action of the oxidant is not adversely affected. Other electrolytes which may be used are sodium chloride, potassium chloride and sodium nitrate. Maleic acid may be used instead of oxalic acid to adjust the pH of the impregnant. Other polyhydroxy phenols, such as pyrogallol and the like, may be used instead of catechol as the lake forming compound.

The invention is not to be regarded as limited to use of the particular relative quantities of oxidants set forth in the examples given above. What is essential is that sufficient oxidant be used to intensify the recorded mark at least visibly and in the optimum, to intensify the mark at maximum marking current to a black tone which is denser than that obtainable by heating the marked paper as taught in the Tribble Patent 2,485,678.

A convenient method of impregnation is to pass a porous paper sheet having high wet strength through a bath made according to one of the above formulae. The solution is allowed to distribute itself evenly throughout the paper. After impregnation of the paper, excess impregnant should be removed, as for example by passing the paper through pressure rolls, so that when used for recording, the paper has about 40 percent moisture by weight. In storage, the impregnated paper is kept in sealed containers to retard evaporation.

The extremely black marks obtainable by the present invention have found especial utility in the reproduction of photographs in newspapers, magazines and other publications. By the use of known facsimile transmission techniques a photograph including a range of color tonal values from white to black may be sent to a remote point electrically and recorded as a facsimile copy on recording paper embodying the present invention. The facsimile copy will include a greater range of recorded tone values than has hitherto been attainable and in fact will be found to be very little different from the original photograph transmitted. From the ultimate picture reproduced in the printed publication it will not be apparent whether the facsimile copy or the original photograph served as the basis for the printed picture.

The shapes of curves shown in the drawing are only to be taken as illustrative of the characteristics of recording papers embodying the present and prior art inventions. The curves are subject to variations depending on the particular formulations of impregnants used. Thus with certain formulations of impregnants embodying the present invention, if the paper is heated during recording the deepest tone mark $B_m$ may appear somewhat blacker than if the paper is unheated, and the unheated paper may be closer in ultimate tonal density to that shown for curves B and B', as indicated by the dotted lines $C_m$ and $C'_m$. Also the curves C and C' need not necessarily follow curves A and A' exactly as shown in the drawing. Curves C and C' may be disposed closer to curves B and B' respectively than to curves A and A' depending on the particular formulation of the impregnant.

What is claimed is:
1. A recording medium electrolytically markable on passage of electric current therethrough between a pair of metal electrodes, comprising a porous support impregnated with an aqueous solution containing an electrolyte for dissolving the metal of one of said electrodes therein, catechol, an acidifier, and a metallic chlorate to deepen the blackness of a grey-black metal lake formed by reaction of the catechol with the metal of one of said electrodes.

2. A recording medium electrolytically markable on passage of electric current therethrough between a pair of metal electrodes, comprising a porous support impregnated with an aqueous solution of an electrolyte, an organic compound forming a grey-black colored lake with the metal of one of said electrodes, an acidifier for said solution, and an oxidant for deepening the color of said lake at a temperature below the boiling point of said solution, said oxidant being selected from the class consisting of chlorate, iodate, bromate, perchlorate, and periodate metal salts.

3. A recording medium electrolytically markable on passage of electric current therethrough between a pair of metal electrodes, comprising a porous support impregnated with an aqueous solution of an electrolyte for dissolving the metal of one of the electrodes, a polyhydroxy phenolic metal lake forming compound, an acid for adjusting the pH of the solution, an oxidant for said metal lake, said oxidant being selected from the class consisting of chlorate, iodate, bromate, perchlorate, and periodate metal salts, and thiourea for stabilizing the lake forming compound and preventing oxidation thereof.

4. A recording medium comprising a white paper sheet impregnated with a colorless solution containing in approximate parts by relative weight: an electrolyte 5, a metal lake forming polyhydroxy phenolic compound 5, an acidifier 0.1, a metallic chlorate 5, and water 100.

5. A recording medium according to claim 4, wherein the solution further comprises thiourea in approximately 0.1 part by relative weight to increase the stability of said compound.

6. A recording medium electrolytically markable on passage of electric current therethrough between a pair of metal electrodes, comprising a porous support impregnated with an aqueous solution of an electrolyte, an organic compound forming a colored lake with the metal of one of said electrodes, and an oxidant for deepening the color of said lake, said oxidant being selected from the class consisting of chlorate and perchlorate metal salts.

References Cited in the file of this patent

UNITED STATES PATENTS

| | | |
|---|---|---|
| 1,844,199 | Bicknell et al. | Feb. 9, 1932 |
| 1,970,539 | Bausch | Aug. 21, 1934 |
| 2,339,267 | Hogan et al. | Jan. 18, 1944 |
| 2,485,678 | Tribble | Oct. 25, 1949 |